US008665730B2

United States Patent
Ozaki et al.

(10) Patent No.: US 8,665,730 B2
(45) Date of Patent: Mar. 4, 2014

(54) TEST DEVICE AND TEST METHOD FOR MOBILE COMMUNICATION TERMINAL

(75) Inventors: Masanori Ozaki, Atsugi (JP); Takeshi Yoshida, Atsugi (JP); Fumitaka Nonaka, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 139 days.

(21) Appl. No.: 13/489,497

(22) Filed: Jun. 6, 2012

(65) Prior Publication Data

US 2012/0327796 A1 Dec. 27, 2012

(30) Foreign Application Priority Data

Jun. 24, 2011 (JP) ................................. 2011-140857

(51) Int. Cl.
*H04W 24/06* (2009.01)

(52) U.S. Cl.
USPC ............ 370/241; 370/252; 455/423; 455/566

(58) Field of Classification Search
USPC ............................ 370/241, 252; 455/566, 423
See application file for complete search history.

(56) References Cited

U.S. PATENT DOCUMENTS

| 7,190,978 | B2* | 3/2007 | Saikyo et al. | 455/566 |
|---|---|---|---|---|
| 7,974,829 | B2* | 7/2011 | Ko | 703/24 |
| 2001/0036201 | A1* | 11/2001 | Dieterich et al. | 370/506 |
| 2002/0183054 | A1* | 12/2002 | Rimoni et al. | 455/423 |
| 2008/0080536 | A1* | 4/2008 | Chhaya et al. | 370/401 |
| 2010/0120371 | A1* | 5/2010 | Sato et al. | 455/67.14 |

* cited by examiner

*Primary Examiner* — Albert T Chou
(74) *Attorney, Agent, or Firm* — Pearne & Gordon LLP (57) ABSTRACT

To reduce the load of a communication process performed between pseudo base stations of different communication standards. An LTE pseudo base station unit 3 includes: an LTE message processing unit 3b that transmits broadcast information including base station information about a C2K pseudo base station unit 4 to a mobile communication terminal 10, which is a test target, extracts location registration request message information from data when receiving the data including the location registration request message information as response message information to the transmitted broadcast information, and outputs the location registration request message information; and a specific C2K message processing unit 3c that outputs the location registration request message information as response message information when receiving the location registration request message information from the LTE message processing unit 3b.

12 Claims, 5 Drawing Sheets

TEST DEVICE AND TEST METHOD FOR MOBILE COMMUNICATION TERMINAL

TECHNICAL FIELD

The present invention relates to a test device and a test method for a mobile communication terminal which test the operation of a mobile communication terminal (for example, a mobile phone) using an arbitrary communication system among various communication systems (for example, CDMA2000 and LTE).

BACKGROUND ART

Patent Document 1 discloses a pseudo base station apparatus which tests the operation of mobile communication terminals (for example, mobile phones) using W-CDMA, CDMA2000 (including CDMA2000 1X and CDMA2000EV-DO which are hereinafter generically referred to as "C2K"), and GSM, which are communication systems according to the related art. Next, the C2K system will be described as an example of the communication system according to the related art.

In recent years, an LTE (Long Term Evolution) system has been developed as a next-generation communication system for further improving the data transmission speed of the C2K system, which is a communication system according to the related art.

The LTE system uses OFDMA (Orthogonal Frequency Division Multiple Access) for downlink and SC-FDMA (Single Carrier Frequency Division Multiple Access) for uplink and requires the following communication speed: a downlink peak data rate of 100 Mbps or more and an uplink peak data rate of 50 Mbps or more (in a frequency bandwidth of 20 MHz). Many C2K communication service providers are expected to use the LTE system in the future.

However, there are maintenance problems of communication facilities or technical problems (in practice, the LTE system having a packet switching network is suitable for data communication and the existing C2K system having a circuit switching network is suitable for phone calls or SMS). Therefore, a method is considered which uses both the LTE and C2K systems at present, gradually expands the communication area of the LTE system, and finally changes the communication service to the LTE service while ending the C2K service.

There are mobile phones which do not perform LTE communication and C2K communication at the same time. When such a mobile phone is used, location registrations are needed to be done to both the nearest LTE base station and C2K base station. This method which registers the location to both the base stations using different communication systems to perform a smooth handover has been defined as a communication standard.

That is, the LTE base station can store base station information for the C2K base station and broadcast a mobile phone of its own base station information and the base station information about the C2K base station as broadcast information. In addition, the LTE base station can notify the location registration information of the mobile phone which communicates with the LTE base station to the C2K base station through a wired network. Therefore, the mobile phone can perform a location registration process, which should be originally performed with the C2K base station, with the LTE base station. Therefore, only a call connection process may be performed between the C2K base station and the mobile phone.

As such, for the period in which both the LTE and C2K services are available, CS Fallback (CSFB) is used which is one method in which, when the packet switching network wants to perform circuit switching communication, such as voice communication, it hands over the service area to a mobile communication system having a circuit switching network such that line exchange communication is performed. In this way, it is possible to appropriately perform a handover between the LTE base station and the C2K base station and perform communication with the base station corresponding to the service.

Patent Document 2 discloses a device which tests the handover operation of a mobile communication terminal between the base stations using different communication systems.

RELATED ART DOCUMENT

Patent Document

[Patent Document 1] JP-A-2006-50567 (U.S. Pat. No. 7,190, 978B2 and Chinese Patent No. 100399753)
[Patent Document 2] JP-A-2010-136341 (U.S. Patent Application Publication No. 2010/0120371A1)

DISCLOSURE OF THE INVENTION

Problem that the Invention is to Solve

However, when a compulsory handover test including location registration is performed between the base stations using different communication systems, communication is actually performed between the LTE base station and the C2K base station. Therefore, when the same handover operation as that in the actual communication state is performed between an LTE pseudo base station and a C2K pseudo base station in the test device, the processing speed is reduced due to the load of the communication process between the LTE pseudo base station and the C2K pseudo base station.

In the actual base station apparatus, the above-mentioned problem does not occur since the base station apparatus is designed so as to be most suitable for a predetermined communication system or function. However, the pseudo base station of the test device needs to respond to various communication systems or functions desired by the users. In order to check the operation of the terminal when a communication error occurs, in some cases, the pseudo base station needs to perform operations which are not generally performed in the actual base station apparatus. Therefore, the processing capability of the pseudo base station is less than that of the actual base station, and a high cost is required to improve the processing capability.

The invention has been made in view of the above-mentioned problems, and an object of the invention is to provide a test device and a test method for a mobile communication terminal capable of reducing the load of the communication process performed between pseudo base stations of different communication standards in, for example, a location registration test or a handover test.

Means for Solving Problem

In order to achieve the object, according to an aspect of the invention, there is provided a mobile communication terminal test device (1) that tests a mobile communication terminal (10) which can communicate in correspondence with a first communication standard, which is a multiple access system, and a second communication standard, which is a multiple access system different from the first communication standard. The mobile communication terminal test device includes a first pseudo base station unit (3) that simulates a base station of the first communication standard and tests an operation of the mobile communication terminal according to a scenario which is described in a sequence of preset message information. The first pseudo base station unit includes: a first transmitting and receiving unit (3a) that transmits and receives an RF signal to and from the mobile communication terminal; a first message processing unit (3b) that transmits broadcast information including base station information of the second communication standard to the mobile communication terminal through the first transmitting and receiving unit, extracts location registration request message information from data when receiving the data including the location registration request message information as response message information to the transmitted broadcast information through the first transmitting and receiving unit, and outputs the location registration request message information; and a specific message processing unit (3c) that outputs response message information, which is a response to the location registration request message information and is to be generated by a base station of the second communication standard, to the mobile communication terminal through the first message processing unit and the first transmitting and receiving unit when receiving the location registration request message information from the first message processing unit.

The test device according to the above-mentioned aspect may further include: a second pseudo base station unit (4) that simulates a base station of the second communication standard; and a coupling unit (2) that transmits an RF signal from the first pseudo base station unit and the second pseudo base station unit to the mobile communication terminal and transmits the RF signal from the mobile communication terminal to the first pseudo base station unit and the second pseudo base station unit. The broadcast information transmitted by the first message processing unit may include base station information about the second pseudo base station unit. The specific message processing unit may output state information indicating that the response message information indicating an allowance of the location registration has been output to the second pseudo base station unit. The second pseudo base station unit may include: a second transmitting and receiving unit (4a) that transmits and receives an RF signal to and from the mobile communication terminal; a second message processing unit (4b) that performs message processing on the message information exchanged between the mobile communication terminal and the second transmitting and receiving unit; and a state parameter management unit (4c) that changes the state of the second message processing unit on the basis of the state information from the specific message processing unit when the location registration of the mobile communication terminal has been completed.

In the test device according to the above-mentioned aspect, the second message processing unit may include a second scenario storage unit (4d) that stores a second scenario for testing an operation of the second communication standard.

In the test device according to the above-mentioned aspect, the first message processing unit may include a first scenario storage unit (3d) that stores a first scenario for testing an operation of the first communication standard.

In the test device according to the above-mentioned aspect, the first message processing unit may include a broadcast information storage unit (3e) that stores the broadcast information including the base station information of the second communication standard in advance.

In the test device according to the above-mentioned aspect, the specific message processing unit may include a specific message storage unit (3g) that stores the response message information in advance.

According to another aspect of the invention, there is provided a test method using a mobile communication terminal test device (1) that tests a mobile communication terminal (10) which can communicate in correspondence with a first communication standard, which is a multiple access system, and a second communication standard, which is a multiple access system different from the first communication standard, includes a first pseudo base station unit (3) which simulates a base station of the first communication standard, and tests an operation of the mobile communication terminal according to a scenario which is described in a sequence of preset message information. The test method includes: a step of transmitting broadcast information including base station information of the second communication standard from the first pseudo base station unit to the mobile communication terminal and extracting location registration request message information from data when receiving the data including the location registration request message information as response message information to the transmitted broadcast information; and a step of outputting response message information, which is a response to the extracted location registration request message information and is to be generated by a base station of the second communication standard, from the first pseudo base station unit to the mobile communication terminal.

In the test method according to the above-mentioned aspect, the test device may further include: a second pseudo base station unit (4) that simulates a base station of the second communication standard; and a coupling unit (2) that transmits an RF signal from the first pseudo base station unit and the second pseudo base station unit to the mobile communication terminal and transmits the RF signal from the mobile communication terminal to the first pseudo base station unit and the second pseudo base station unit. The broadcast information transmitted by the first message processing unit may include base station information about the second pseudo base station unit. The test method may further include: a step of outputting state information indicating that response message information indicating an allowance of the location registration has been output to the second pseudo base station unit; a step of changing the state of the second message processing unit on the basis of the state information when the location registration of the mobile communication terminal has been completed; and a step of allowing the second pseudo base station unit to perform message processing on the message information exchanged between the mobile communication terminal and the second pseudo base station unit after the state is changed.

The test method according to the above-mentioned aspect may further include a step of storing a second scenario for storing a second scenario for testing an operation of the second communication standard in the second pseudo base station unit before the test.

The test method according to the above-mentioned aspect may further include a step of storing a first scenario for testing an operation of the first communication standard in the first pseudo base station unit before the test.

The test method according to the above-mentioned aspect may further include a step of storing the broadcast information including the base station information of the second communication standard in the first pseudo base station unit before the test.

The test method according to the above-mentioned aspect may further include a step of storing the response message information in the first pseudo base station unit before the test.

Advantage of the Invention

According to the mobile communication terminal test device of the invention, it is possible to minimize the amount of message information exchanged between an LTE pseudo base station unit, which is a first pseudo base station unit, and a C2K pseudo base station unit, which is a second pseudo base station unit, in the location registration test, thereby reducing the amount of traffic. Therefore, it is possible to improve a data communication speed between the terminal to be tested and each pseudo base station unit.

BEST MODE FOR CARRYING OUT THE INVENTION

Hereinafter, exemplary embodiments of the invention will be described in detail with reference to the accompanying drawings. The invention is not limited to the embodiments, but all other embodiments, examples, and operating techniques which can be implemented by those skilled in the art on the basis of the embodiments are included in the scope of the invention.

In the following embodiments, in order to clarify the characteristics of the invention, only components for reducing the amount of data communicating between pseudo base station units of different communication standards, such as a location registration test and a handover test for a mobile communication terminal, which is a test target, will be described. However, for example, general operation tests (for example, a cell selection test and a cell reselection test as test items) for the mobile communication terminal which are based on each communication standard described in Patent Documents 1 and 2 may be performed.

First Embodiment

<Structure of Device>
First, a mobile communication terminal test device according to a first embodiment will be described with reference to FIG. 1 or FIG. 2.

Figure 1:
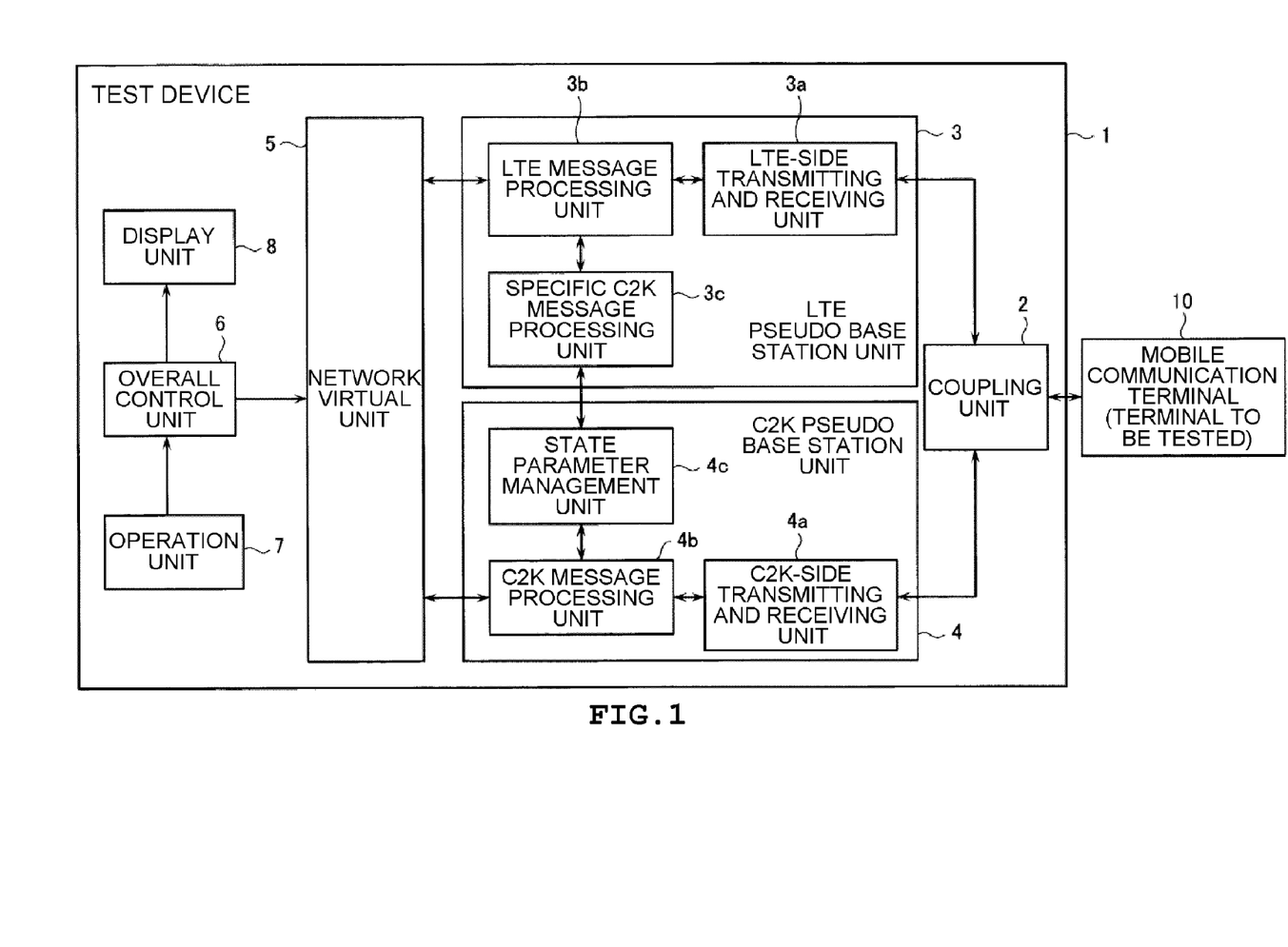
FIG. 1 is a functional block diagram illustrating the structure of a mobile communication terminal test device according to a first embodiment of the invention.
Figure 2:
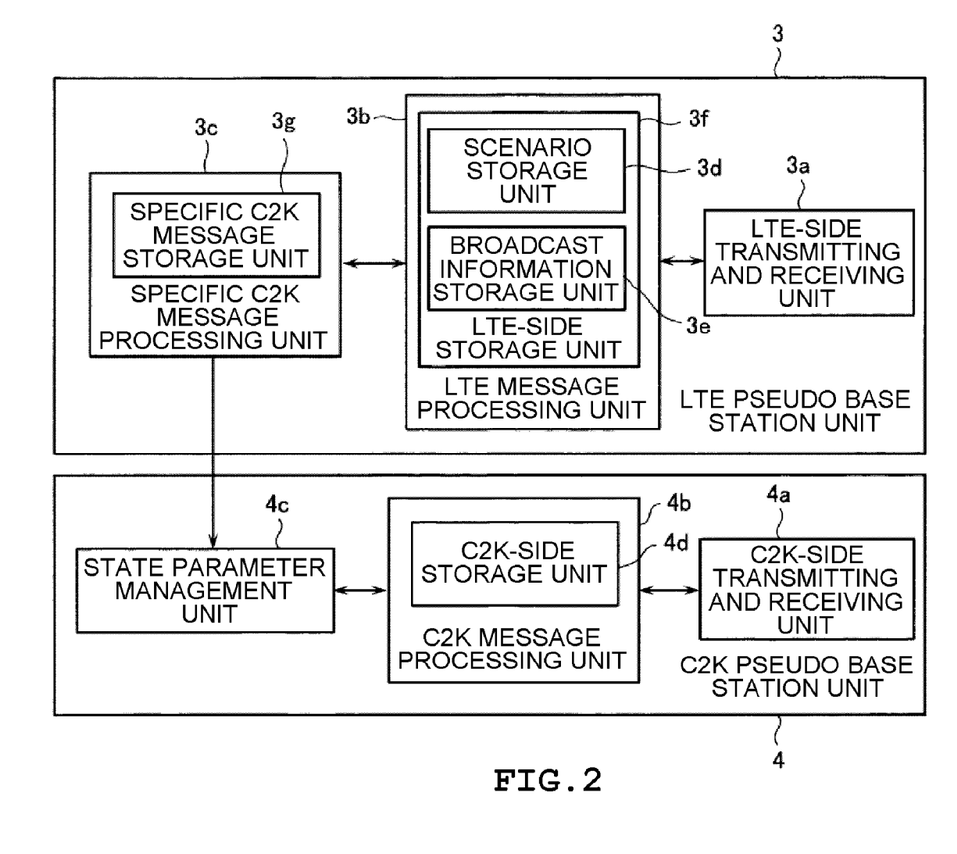
FIG. 2 is a functional block diagram illustrating the detailed device of the mobile communication terminal test device.

As shown in FIG. 1 or FIG. 2, a mobile communication terminal test device 1 according to the first embodiment is a test device (hereinafter, referred to as a "mobile terminal test device 1") which tests various operations of a mobile communication terminal 10 (hereinafter, referred to as a "terminal 10 to be tested"), which is a test target, and includes a coupling unit 2 that couples and distributes signals (RF signals) transmitted and received to and from the terminal 10 to be tested, an LTE pseudo base station unit 3 which is a first pseudo base station simulating a base station using an LTE (Long Term Evolution) system as a communication standard, a C2K pseudo base station unit 4 which is a second pseudo base station simulating a base station using CDMA2000 (including CDMA2000 1X and CDMA2000EV-DO which are generically referred to as "C2K"), which is a multiple access system different from the LTE system as the communication standard, as a communication system, a network virtual unit 5 that virtually implements the function of a connection destination (for example, a telephone, a server, or a TV phone) for simulating the actual connection environment between the LTE pseudo base station unit 3 or the C2K pseudo base station unit 4 and the terminal 10 to be tested, an overall control unit 6 that controls each unit of the device, an operation unit 7 that is used by the user to set various settings, and a display unit 8 that displays, for example, the test result.

The mobile terminal test device 1 and the terminal 10 to be tested communicate with each other using RF signals. As a transmission system, signals may be transmitted between the mobile terminal test device 1 and the terminal 10 to be tested by wire, for example, through coaxial cable, or an antenna may be provided in the mobile terminal test device 1 and signals may be transmitted wirelessly therebetween. In addition, during the operation test, the terminal 10 to be tested communicates with one of the LTE pseudo base station unit 3 and the C2K pseudo base station unit 4 such that a one-to-one relationship is established therebetween.

(LTE Pseudo Base Station Unit)
The LTE pseudo base station unit 3, which is the first pseudo base station unit, includes an LTE-side transmitting and receiving unit 3a, an LTE message processing unit 3b, and a specific C2K message processing unit 3c and functions as a pseudo base station which communicates with the terminal 10 to be tested using LTE as a communication standard.

The LTE-side transmitting and receiving unit 3a receives an RF input signal (signal including message information according to a sequence described in a scenario to be performed) from the terminal 10 to be tested through the coupling unit 2 and outputs the received signal as data including message information to the LTE message processing unit 3b.

In addition, when receiving data including message information from the LTE message processing unit 3b, the LTE-side transmitting and receiving unit 3a performs an RF transmitting process on the data to generate an RF output signal and outputs the RF output signal to the terminal 10 to be tested.

The LTE message processing unit 3b functions as a first message processing unit in the first pseudo base station unit and performs message processing between the terminal 10 to be tested and a virtual connection destination which is selected in advance according to the scenario stored in scenario storage means 3d, which will be described below, such that a predetermined operation test for the terminal 10 to be tested can be performed on the basis of an LTE scenario.

Specifically, the LTE message processing unit 3b transmits message information which is received from the terminal 10 to be tested by the LTE-side transmitting and receiving unit 3a to a virtual connection destination (for example, a virtual telephone, a virtual server, or a virtual TV phone), performs message processing on the basis of the LTE scenario corresponding to the content of the test, and outputs data including message information corresponding to the processing result to the LTE-side transmitting and receiving unit 3a.

The LTE message processing unit 3b includes an LTE-side storage unit 3f including scenario storage means 3d for storing a scenario in which a sequence for performing a predetermined operation test is described and broadcast information storage means 3e for storing, as broadcast information, the base station information of the LTE pseudo base station unit 3 and the base station information of the C2K pseudo base station unit 4 to be transmitted to the terminal 10 to be tested.

In addition, when receiving data obtained by encapsulating message information (hereinafter, referred to as "C2K message information") exchanged between the terminal 10 to be tested and the C2K pseudo base station unit 4, the LTE message processing unit 3b decapsulates the data to extract the C2K message information and outputs the C2K message information to the specific C2K message processing unit 3c. When receiving the specific C2K message information output from the specific C2K message processing unit 3c, the LTE message processing unit 3b encapsulates the message to generate data and outputs the data to the LTE-side transmitting and receiving unit 3a.

The specific C2K message processing unit 3c functions as a specific message processing unit in the first pseudo base station unit and includes a specific C2K message storage unit 3g that stores, as specific C2K message information, response message information (for example, a C2K location registration allowance notice message (Registration Accepted Order) during the operation test related to a location registration test) which is transmitted from the C2K pseudo base station unit 4 in response to C2K message information (for example, a location registration request message (Registration Message)) transmitted from the terminal 10 to be tested and a incoming call notice (General Page Message) during the operation test related to the incoming voice call from the network, in the operation test (for example, a location registration test and a call test, such as a incoming or call test) in which messages are exchanged between the LTE pseudo base station unit 3 and the C2K pseudo base station unit 4.

For example, when the state of the C2K pseudo base station unit 4 is changed due to the above-mentioned operation test, the specific C2K message processing unit 3c outputs state information (for example, a location registration completion notice in the operation test related to the location registration test) indicating the content of the change to the C2K pseudo base station unit 4.

As such, when the specific C2K message processing unit 3c stores the specific C2K message information, during the operation test in which message information is exchanged between the LTE pseudo base station unit 3 and the C2K pseudo base station unit 4, the exchange of the C2K message information with the C2K pseudo base station unit 4 is performed in the specific C2K message processing unit 3c. Therefore, it seems that communication is performed between the LTE pseudo base station unit 3 and the C2K pseudo base station unit 4.

In this way, only necessary information (state information) is communicated to minimize the number of messages exchanged between the pseudo base station units. As a result, the amount of traffic is reduced and the data communication speed between the terminal 10 to be tested and each pseudo base station unit is improved.

(C2K Pseudo Base Station Unit)

The C2K pseudo base station unit 4, which is the second pseudo base station unit, includes a C2K-side transmitting and receiving unit 4a, a C2K message processing unit 4b, and a state parameter management unit 4c and functions as a pseudo base station which communicates with the terminal 10 to be tested using C2K (including CDMA2000, CDMA2000 1X, and CDMA2000EV-DO), which is a communication standard of a multiple access system different from the LTE system for communication with the terminal 10 to be tested.

Similarly to the LTE-side transmitting and receiving unit 3a, the C2K-side transmitting and receiving unit 4a receives an RF input signal (signal including message information according to a sequence described in a scenario to be performed) from the terminal 10 to be tested through the coupling unit 2 and outputs data including message information to the C2K message processing unit 4b.

In addition, when receiving data including message information corresponding to the sequence of the scenario which is being performed from the C2K message processing unit 4b, the C2K-side transmitting and receiving unit 4a performs an RF transmitting process on the data to generate an RF output signal and transmits the RF output signal to the terminal 10 to be tested.

The C2K message processing unit 4b functions as a second message processing unit in the second pseudo base station unit and performs message processing between the terminal 10 to be tested and a virtual connection destination which is selected in advance according to the scenario stored in C2K-side storage means 4d, described below, such that the predetermined operation test for the terminal 10 to be tested can be performed on the basis of the scenario of a C2K communication system different from LTE.

Specifically, the C2K message processing unit 4b transmits message information which is received from the terminal 10 to be tested by the C2K-side transmitting and receiving unit 4a to a virtual connection destination (for example, a virtual telephone, a virtual server, or a virtual TV phone), performs message processing on the basis of the C2K scenario corresponding to the content of the test, and outputs data including message information corresponding to the processing result to the C2K-side transmitting and receiving unit 4a.

When the operation test (for example, a incoming voice call test) is performed for the terminal 10 to be tested and a state change occurs according to the operation which is performed, the C2K message processing unit 4b outputs the changed state information (for example, a incoming call sequence completion notice in the incoming voice call test) to the state parameter management unit 4c. The C2K message processing unit 4b includes a C2K-side storage unit 4d which stores the scenario in which a sequence for performing a predetermined operation test is described.

When receiving state information (for example, the location registration completion notice in the location registration test) which is transmitted from the LTE pseudo base station unit 3 to the C2K pseudo base station unit 4 or state information (for example, the incoming call sequence completion notice in the incoming voice call test) transmitted from the C2K message processing unit 4b, the state parameter management unit 4c changes parameters indicating the current test state on the basis of the state information.

An example of the state change process will be described below. When a notice indicating the completion of the registration of the C2K base station information in the handover test is input from the specific C2K message processing unit 3c, the state is changed similarly to when the location registration process is completed, since the location registration process of the C2K pseudo base station unit 4 with the terminal 10 to be tested has been completed. In this way, the C2K message processing unit 4b performs message processing related to, for example, a communication operation with the terminal 10 to be tested according to the scenario of the handover test.

The network virtual unit 5 virtually implements the function of a connection destination (for example, a telephone, a server, or a TV phone) for simulating the actual connection environment between the LTE pseudo base station unit 3 or the C2K pseudo base station unit 4 and the terminal 10 to be tested.

The overall control unit 6 controls the operation of each unit of the mobile terminal test device 1. For example, the overall control unit 6 controls the setting of parameters or the operation timing of each pseudo base station unit such that the scenario based on the selected operation test is performed, and controls the processing operation of the virtual connection destination corresponding to the scenario performed in the network virtual unit 5.

The operation unit 7 is an input device, such as a keyboard device or a pointing device, and is used to input test items for the terminal 10 to be tested or combinations of the test items.

The display unit 8 is a display device, such as an LCD (Liquid Crystal Display), and displays various kinds of display content (for example, a test item selection display screen or the test result) required to drive the mobile terminal test device 1.

<Processing Operation>

Next, the processing operation of the mobile terminal test device 1 during the operation test will be described with reference to FIGS. 3 and 4. An example of the processing operation (FIG. 3) during the location registration test performed between the terminal 10 to be tested and the LTE pseudo base station unit 3 as the operation test and an example of the processing operation (FIG. 4) during the handover test performed between the LTE pseudo base station unit 3 and the C2K pseudo base station unit 4 as the operation test will be described below.

The detailed description of message processing in an "LTE location registration operation" in the location registration test and a "incoming voice call operation", a "incoming call sequence operation", a "communication state operation", and a "communication end and disconnection operation" in the handover test is omitted, and a message information exchange operation, which is the main operation of the invention, will be described in detail below.

(Location Registration Test)

Figure 3:
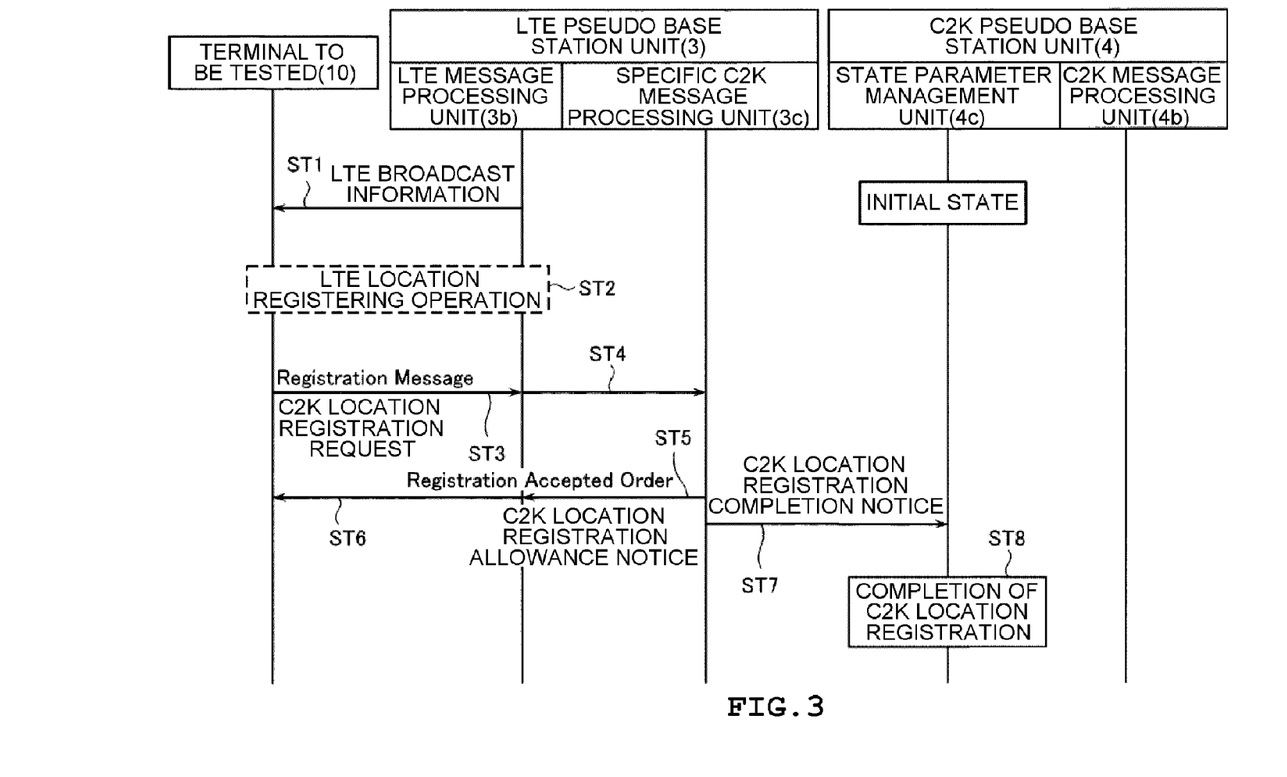
FIG. 3 is a sequence diagram illustrating an example of a location registration test process of the mobile communication terminal test device.

As shown in FIG. 3, in the location registration test between the terminal 10 to be tested and the LTE pseudo base station unit 3, first, when a predetermined operation is input through the operation unit 7 according to the display content of the display unit 8 to perform the scenario of the location registration test, the LTE pseudo base station unit 3 transmits broadcast information including LTE base station information and C2K base station information to the terminal 10 to be tested (ST1). Then, the "LTE location registration operation", which is an operation of registering the location of the terminal 10 to be tested, is performed between the LTE pseudo base station unit 3 and the terminal 10 to be tested on the basis of the broadcast information transmitted from the LTE pseudo base station unit 3 (ST2).

Then, in order to register location information indicating the location of the terminal 10 to be tested to the C2K pseudo base station unit 4, the terminal 10 to be tested transmits message information including a C2K location registration request message (Registration Message) to the LTE pseudo base station unit 3 (ST3). When receiving data including the C2K location registration request message from the terminal 10 to be tested, the LTE pseudo base station unit 3 decapsulates the data to extract the C2K location registration request message and outputs the C2K location registration request message to the specific C2K message processing unit 3c (ST4).

The specific C2K message processing unit 3c selects a C2K location registration allowance notice message (Registration Accepted Order) as response message information to the input C2K location registration request message according to the scenario of the location registration test and outputs the C2K location registration allowance notice message to the LTE message processing unit 3b (ST5).

The LTE message processing unit 3b encapsulates the C2K location registration allowance notice message and transmits the encapsulated data to the terminal 10 to be tested through the LTE-side transmitting and receiving unit 3a (ST6). In addition, the specific C2K message processing unit 3c outputs state information indicating the completion of the operation of registering the location of the terminal 10 to be tested to the C2K pseudo base station unit 4 (ST7). The state parameter management unit 4c changes the parameters indicating the current test state according to the input state information (ST8) and the location registration test ends.

(Handover Test)

Figure 4:
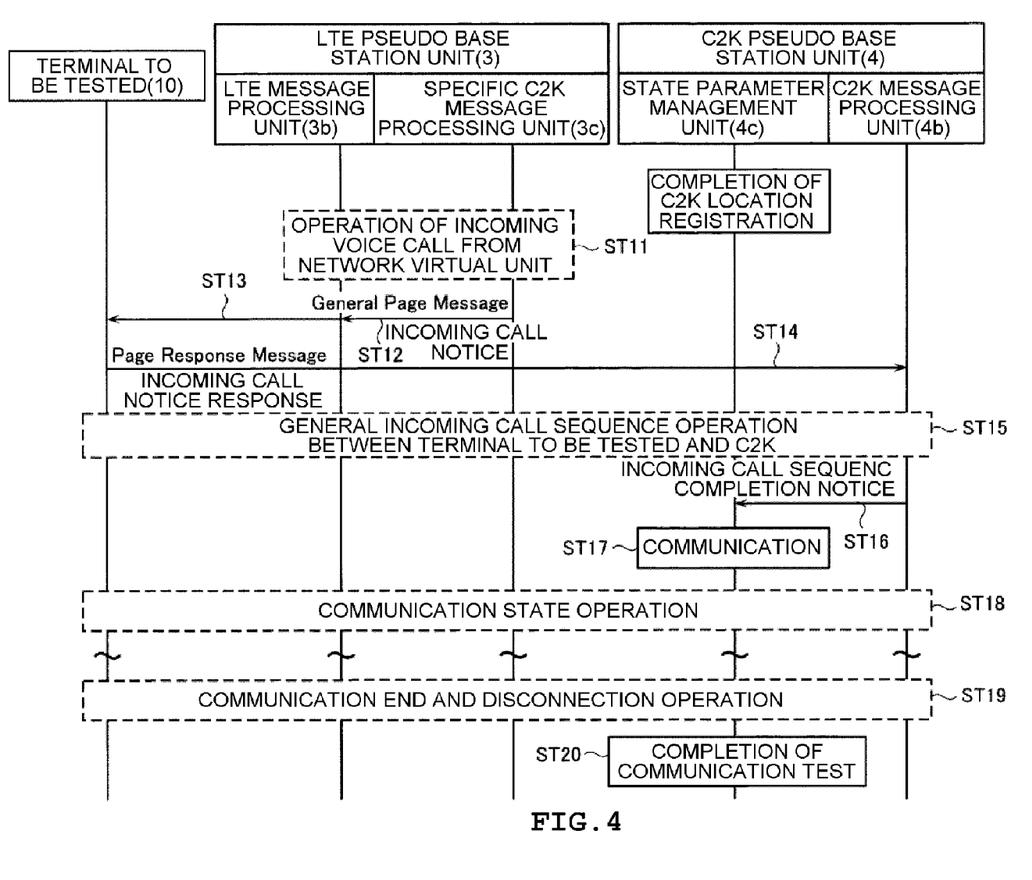
FIG. 4 is a sequence diagram illustrating an example of a handover test process of the mobile communication terminal test device.

As shown in FIG. 4, in the handover test between the LTE pseudo base station unit 3 and the C2K pseudo base station unit 4, it is assumed that the location registration of the terminal 10 to be tested has been completed. First, when a predetermined operation is input through the operation unit 7 according to the display content of the display unit 8 to perform the scenario of the handover test, a virtual connection destination which is selected in advance performs a "incoming voice call operation" on the terminal 10 to be tested between the LTE message processing unit 3b and the specific C2K message processing unit 3c (ST11).

Then, in order to transmit a incoming call notice from the LTE pseudo base station unit 3 to the terminal 10 to be tested, the specific C2K message processing unit 3c selects a incoming call notice message (General Page Message), which is specific C2K message information, and outputs the incoming call notice message to the LTE message processing unit 3b (ST12). Then, the LTE message processing unit 3b encapsulates the specific C2K message information and transmits the encapsulated data to the terminal 10 to be tested through the LTE-side transmitting and receiving unit 3a (ST13).

The terminal 10 to be tested receives the incoming call notice message from the LTE pseudo base station unit 3 and transmits a incoming call notice response message (Page Response Message) as a response to the incoming call notice message to the C2K pseudo base station unit 4 (ST14).

Then, when receiving the incoming call notice response message from the terminal 10 to be tested, the C2K pseudo base station unit 4 performs the "incoming call sequence operation" between the C2K message processing unit 4b of the C2K pseudo base station unit 4 and the terminal 10 to be tested (ST15). When communication is performed between the C2K pseudo base station unit 4 and the terminal 10 to be tested, a incoming call sequence completion notice is output from the C2K message processing unit 4b to the state parameter management unit 4c (ST16). The state parameter management unit 4c changes the state to a communication state (ST17).

Then, the "communication state operation" is performed to maintain the communication between the C2K pseudo base station unit 4 and the terminal 10 to be tested (ST18). When a predetermined operation test ends, the "communication end and disconnection operation" is performed (ST19). The state parameter management unit 4c performs a state change corresponding to the completion of the communication test (ST20). In this way, the handover test ends.

As described above, in the mobile terminal test device 1 according to the first embodiment, when receiving data including the C2K message information input from the terminal 10 to be tested, the LTE message processing unit 3b decapsulates the data to extract the C2K message information and outputs the C2K message information to the specific C2K message processing unit 3c. The specific C2K message processing unit 3c outputs response message information to the input C2K message information to the LTE message processing unit 3b. The message information is encapsulated and transmitted to the terminal 10 to be tested.

In this way, a message information exchange operation between the LTE pseudo base station unit 3 and the C2K pseudo base station unit 4 as in the location registration test is omitted, and it is possible to perform an operation as if message information is exchanged between the LTE pseudo base station unit 3 and the C2K pseudo base station unit 4. Therefore, it is possible to reduce the amount of traffic in the test device 1.

Second Embodiment

Figure 5:
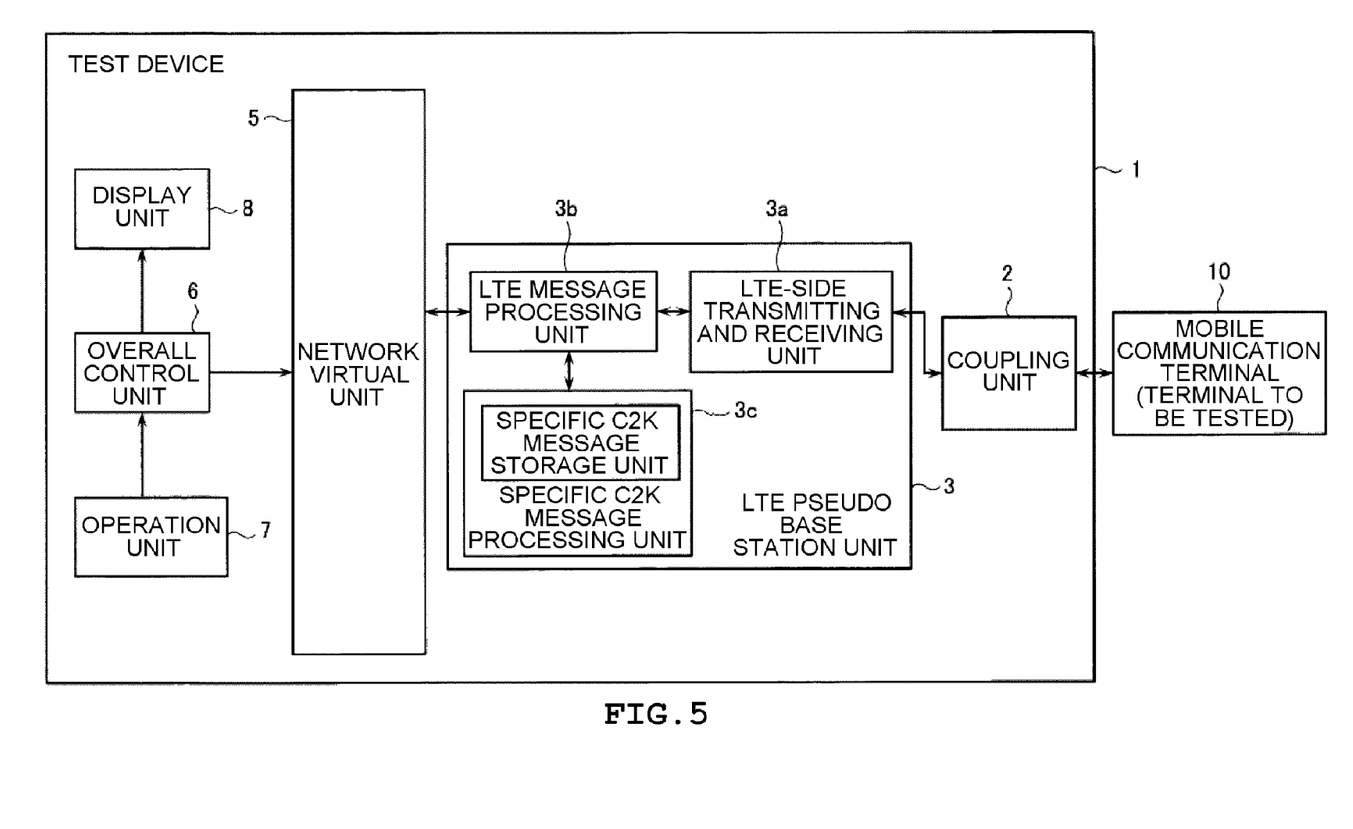
FIG. 5 is a schematic block diagram illustrating the structure of a mobile communication terminal test device according to a second embodiment of the invention.

Next, a mobile communication terminal test device 1 according to a second embodiment of the invention will be described with reference to FIG. 5. In FIG. 5, the same components as those in the first embodiment are denoted by the same reference numerals and the description thereof will not be repeated. Only the main components of this embodiment will be described below.

As shown in FIG. 5, in the second embodiment, the C2K pseudo base station unit 4 is removed from the mobile terminal test device 1 according to the first embodiment and an LTE pseudo base station unit 3 communicates with a terminal 10 to be tested using LTE as a communication standard. An operation test (for example, a location registration test) can be performed using a specific C2K message which is stored in a specific C2K message storage unit 3g even though the C2K pseudo base station unit 4 is not provided. The detailed structure of the LTE pseudo base station unit 3 is the same as that shown in FIG. 2.

That is, in this embodiment, since the C2K pseudo base station unit 4 is removed, state information is not output from the LTE pseudo base station unit 3 to the C2K pseudo base station unit 4, and only the operation test related to LTE and the operation test using a C2K message are performed between the mobile terminal test device and the terminal 10 to be tested.

In the test up to a process of registering the location of the terminal 10 to be tested as a processing operation, Steps ST1 to ST6 are the same as those in the location registration test according to the first embodiment shown in FIG. 3 and Steps ST7 and ST8 are omitted since the C2K pseudo base station unit 4 is not provided.

As such, in the mobile communication terminal test device 1 according to the second embodiment, the C2K pseudo base station unit 4 is removed from the components. Therefore, the mobile communication terminal test device 1 can perform simple operation tests which do not directly require the C2K pseudo base station unit 4 and can be performed using only the C2K message, such a location registration test and an operation test when LTE is used as the communication standard. As a result, it is possible to simplify the structure of the device, as compared to the first embodiment.

In the above-described embodiments, the first pseudo base station unit 3 uses the LTE system as the communication standard and the second pseudo base station unit 4 uses the C2K system different from the LTE system as the communication standard. However, the invention is not limited thereto. A combination of the communication standards is not particularly limited as long as at least the first pseudo base station unit 3 and the second pseudo base station unit 4 use multiple access systems of different communication standards and message information is exchanged between the pseudo base station units as in the process of the above-mentioned location registration test.

DESCRIPTION OF REFERENCE NUMERALS AND SIGNS

1: MOBILE COMMUNICATION TERMINAL TEST DEVICE (MOBILE TERMINAL TEST DEVICE)
2: COUPLING UNIT
3: LTE PSEUDO BASE STATION UNIT (FIRST PSEUDO BASE STATION UNIT)
3a: LTE-SIDE TRANSMITTING AND RECEIVING UNIT
3b: LTE MESSAGE PROCESSING UNIT (FIRST MESSAGE PROCESSING UNIT)
3c: SPECIFIC C2K MESSAGE PROCESSING UNIT (SPECIFIC MESSAGE PROCESSING UNIT)
3d: SCENARIO STORAGE MEANS
3e: BROADCAST INFORMATION STORAGE MEANS
3f: LTE-SIDE STORAGE UNIT
3g: SPECIFIC C2K MESSAGE STORAGE UNIT
4: C2K PSEUDO BASE STATION UNIT (SECOND PSEUDO BASE STATION UNIT)
4a: C2K-SIDE TRANSMITTING AND RECEIVING UNIT
4b: C2K MESSAGE PROCESSING UNIT (SECOND MESSAGE PROCESSING UNIT)
4c: STATE PARAMETER MANAGEMENT UNIT
4d: C2K-SIDE STORAGE UNIT
5: NETWORK VIRTUAL UNIT
6: OVERALL CONTROL UNIT
7: OPERATION UNIT
8: DISPLAY UNIT
10: MOBILE COMMUNICATION TERMINAL (TERMINAL TO BE TESTED)

The invention claimed is:

1. A mobile communication terminal test device that tests a mobile communication terminal which can communicate in correspondence with a first communication standard, which is a multiple access system, and a second communication standard, which is a multiple access system different from the first communication standard, comprising:
a first pseudo base station unit that simulates a base station of the first communication standard,
wherein an operation of the mobile communication terminal is tested according to a scenario in which a sequence of preset message information is described, and
the first pseudo base station unit includes:
a first transmitting and receiving unit that transmits and receives an RF signal to and from the mobile communication terminal;
a first message processing unit that transmits broadcast information including base station information of the second communication standard to the mobile communication terminal through the first transmitting and receiving unit, extracts location registration request message information from data when receiving the data including the location registration request message information as response message information to the transmitted broadcast information through the first transmitting and receiving unit, and outputs the location registration request message information; and a specific message processing unit that outputs response message information, which is a response to the location registration request message information and is to be generated by a base station of the second communication standard, to the mobile communication terminal through the first message processing unit and the first transmitting and receiving unit when receiving the location registration request message information from the first message processing unit.

2. The test device according to claim 1, further comprising:
a second pseudo base station unit that simulates a base station of the second communication standard; and
a coupling unit that transmits an RF signal from the first pseudo base station unit and the second pseudo base station unit to the mobile communication terminal and transmits the RF signal from the mobile communication terminal to the first pseudo base station unit and the second pseudo base station unit,
wherein the broadcast information transmitted by the first message processing unit includes base station information about the second pseudo base station unit,
the specific message processing unit outputs state information indicating that the response message information indicating an allowance of the location registration has been output to the second pseudo base station unit, and
the second pseudo base station unit includes:
a second transmitting and receiving unit that transmits and receives an RF signal to and from the mobile communication terminal;
a second message processing unit that performs message processing on the message information exchanged between the mobile communication terminal and the second transmitting and receiving unit; and
a state parameter management unit that changes the state of the second message processing unit on the basis of the state information from the specific message processing unit when the location registration of the mobile communication terminal has been completed.

3. The test device according to claim 2,
wherein the second message processing unit includes a second scenario storage unit that stores a second scenario for testing an operation of the second communication standard.

4. The test device according to claim 1,
wherein the first message processing unit includes a first scenario storage unit that stores a first scenario for testing an operation of the first communication standard.

5. The test device according to claim 1,
wherein the first message processing unit includes a broadcast information storage unit that stores the broadcast information including the base station information of the second communication standard in advance.

6. The test device according to claim 1,
wherein the specific message processing unit includes a specific message storage unit that stores the response message information in advance.

7. A test method using a mobile communication terminal test device that tests a mobile communication terminal which can communicate in correspondence with a first communication standard, which is a multiple access system, and a second communication standard, which is a multiple access system different from the first communication standard, includes a first pseudo base station unit which simulates a base station of the first communication standard, and tests an operation of the mobile communication terminal according to a scenario which is described in a sequence of preset message information, comprising:

a step of transmitting broadcast information including base station information of the second communication standard from the first pseudo base station unit to the mobile communication terminal and extracting location registration request message information from data when the first pseudo base station unit receives the data including the location registration request message information as response message information to the transmitted broadcast information; and a step of outputting response message information, which is a response to the extracted location registration request message information and is to be generated by a base station of the second communication standard, from the first pseudo base station unit to the mobile communication terminal.

8. The test method according to claim 7,
wherein the test device further includes:
a second pseudo base station unit that simulates a base station of the second communication standard; and
a coupling unit that transmits an RF signal from the first pseudo base station unit and the second pseudo base station unit to the mobile communication terminal and transmits the RF signal from the mobile communication terminal to the first pseudo base station unit and the second pseudo base station unit,
the broadcast information transmitted by the first message processing unit includes base station information about the second pseudo base station unit, and
the test method further includes:
a step of outputting state information indicating that response message information indicating an allowance of the location registration has been output to the second pseudo base station unit;
a step of changing the state of the second message processing unit on the basis of the state information when the location registration of the mobile communication terminal has been completed; and
a step of allowing the second pseudo base station unit to perform message processing on the message information exchanged between the mobile communication terminal and the second pseudo base station unit after the state is changed.

9. The test method according to claim 8, further comprising:
a step of storing a second scenario for testing an operation of the second communication standard in the second pseudo base station unit before the test.

10. The test method according to claim 7, further comprising:
a step of storing a first scenario for testing an operation of the first communication standard in the first pseudo base station unit before the test.

11. The test method according to claim 7, further comprising:
a step of storing the broadcast information including the base station information of the second communication standard in the first pseudo base station unit before the test.

12. The test method according to claim 7, further comprising:

a step of storing the response message information in the first pseudo base station unit before the test.

* * * * *